United States Patent
Mei (10) Patent No.: US 7,881,615 B2
(45) Date of Patent: Feb. 1, 2011

(54) DYNAMIC DIGITAL DIAGNOSTIC ALERTS

(75) Inventor: Suohai Mei, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 590 days.

(21) Appl. No.: 11/828,976

(22) Filed: Jul. 26, 2007

(65) Prior Publication Data

US 2009/0028551 A1    Jan. 29, 2009

(51) Int. Cl.
*H04B 10/00* (2006.01)

(52) U.S. Cl. .................. 398/136; 398/135; 398/138; 398/192; 398/22; 398/23; 398/24; 398/25; 372/32; 372/34; 372/36; 372/38.02; 385/89; 385/90; 385/92; 385/93

(58) Field of Classification Search .............. 398/135, 398/136, 137, 138, 139, 128, 130, 158, 159, 398/192, 193, 194, 195, 196, 197, 198, 182, 398/183, 25, 26, 27, 33, 22, 23, 24, 164, 398/202, 208, 209, 200, 214; 372/32, 34, 372/36, 38, 38.02; 385/88, 89, 90, 92, 93

See application file for complete search history.

(56) References Cited

U.S. PATENT DOCUMENTS

| | | | |
|---|---|---|---|
| 4,784,454 A | 11/1988 | Dyott | |
| 5,019,769 A | 5/1991 | Levinson | |
| 5,035,481 A | 7/1991 | Mollenauer | |
| 5,144,632 A | 9/1992 | Thonn | |
| 5,812,572 A | 9/1998 | King et al. | |
| 5,978,113 A | 11/1999 | Kight | |
| 6,400,737 B1 | 6/2002 | Broutin et al. | |
| 6,512,617 B1 | 1/2003 | Tanji et al. | |
| 6,590,644 B1 | 7/2003 | Coin et al. | |
| 6,618,425 B1 | 9/2003 | Carlesi et al. | |
| 6,898,702 B1 | 5/2005 | Evans | |
| 6,978,624 B2 | 12/2005 | Carlson et al. | |
| 7,215,891 B1 | 5/2007 | Chiang et al. | |
| 7,245,835 B1 * | 7/2007 | Giaretta et al. | ............... 398/136 |
| 7,493,048 B2 | 2/2009 | Dybsetter et al. | |
| 7,509,050 B2 | 3/2009 | Ekkizogloy et al. | |
| 7,720,387 B2 * | 5/2010 | Hahin et al. | ................ 398/136 |
| 2002/0027688 A1 | 3/2002 | Stephenson | |
| 2002/0078403 A1 | 6/2002 | Gullo et al. | |

(Continued)

OTHER PUBLICATIONS

U.S. Appl. No. 11/260,448, filed Oct. 27, 2005, Jayne C. Hahin.

(Continued)

*Primary Examiner*—Hanh Phan
(74) *Attorney, Agent, or Firm*—Workman Nydegger (57) ABSTRACT

Alerts, such as laser driver current alarms, are triggered in an optoelectronic device based on dynamic digital diagnostics, such as operating temperature. Optoelectronic devices may execute microcode structured to represent a formulaic relation between a first parameter (e.g., temperature) and an indicator value for a second parameter (e.g., laser driver current). The microcode may further be structured to cause the optoelectronic device to access the first parameter, calculate an indicator value for the second parameter based on the accessed first parameter using the formulaic relation, access the second parameter, and compare the indicator value with the second parameter to determine whether to trigger an alert. If the second parameter exceeds the indicator value, the alert may be triggered, and may be indicative of potentially imminent optoelectronic device failure.

17 Claims, 3 Drawing Sheets

U.S. PATENT DOCUMENTS

| | | |
|---|---|---|
| 2002/0097468 A1 | 7/2002 | Mecherle et al. |
| 2002/0143920 A1 | 10/2002 | Dev et al. |
| 2003/0223756 A1 | 12/2003 | Tatum et al. |
| 2004/0022537 A1 | 2/2004 | Mecherle et al. |
| 2004/0022543 A1 | 2/2004 | Hosking et al. |
| 2004/0033079 A1 | 2/2004 | Sheth et al. |
| 2004/0057730 A1 | 3/2004 | Littlejohn et al. |
| 2004/0136719 A1 | 7/2004 | Hidai et al. |
| 2004/0165888 A1 | 8/2004 | Gerstel et al. |
| 2005/0017751 A1 | 1/2005 | Gunn et al. |
| 2005/0105915 A1 | 5/2005 | Light |
| 2005/0111845 A1 | 5/2005 | Nelson et al. |
| 2006/0002707 A1 | 1/2006 | Ekkizogloy et al. |
| 2006/0002708 A1 | 1/2006 | Hahin et al. |
| 2006/0002709 A1 | 1/2006 | Dybsetter et al. |
| 2006/0020715 A1 | 1/2006 | Jungck |
| 2006/0034612 A1 | 2/2006 | Yu et al. |
| 2006/0051099 A1 | 3/2006 | Ekkisogloy et al. |
| 2006/0093372 A1 | 5/2006 | Hahin et al. |
| 2006/0098699 A1 | 5/2006 | Sanchez |
| 2006/0147217 A1 | 7/2006 | Hahin et al. |
| 2007/0253454 A1 | 11/2007 | Gustavson et al. |
| 2009/0028574 A1* | 1/2009 | Dybsetter et al. ........... 398/135 |

OTHER PUBLICATIONS

U.S. Appl. No. 11/781,407, filed Jul. 23, 2007, Gerald L. Dybsetter.
U.S. Appl. No. 11/260,448, Aug. 5, 2009, Office Action.
U.S. Appl. No. 11/260,448, Feb. 5, 2010, Terminal Disclaimer.
U.S. Appl. No. 11/781,407, Sep. 16, 2009, Office Action.
U.S. Appl. No. 11/781,407, Apr. 12, 2010, Office Action.
U.S. Appl. No. 11/260,448, May 14, 2010, Notice of Allowance.
U.S. Appl. No. 11/260,448, Aug. 12, 2010, Notice of Allowance.
U.S. Appl. No. 10/883,208, Mar. 8, 2007, Non Final Office Action.
U.S. Appl. No. 10/883,208, Oct. 30, 2007, Final Office Action.
U.S. Appl. No. 10/883,208, Apr. 16, 2008, Non Final Office Action.
U.S. Appl. No. 10/883,208, Dec. 5, 2008, Final Office Action.
U.S. Appl. No. 10/883,208, Jul. 21, 2009, Final Office Action.
U.S. Appl. No. 10/883,208, Jan. 7, 2010, Notice of Allowance.
U.S. Appl. No. 10/883,208, Issued May 18, 2010, Issue Notification.

* cited by examiner

DYNAMIC DIGITAL DIAGNOSTIC ALERTS

CROSS-REFERENCE TO RELATED APPLICATIONS

Not applicable.

BACKGROUND OF THE INVENTION

1. The Field of the Invention

The present invention relates generally to optical transmitters and receivers. More specifically, the present invention relates to optical transmitters and receivers that use microcode and/or tables to trigger alerts based on dynamic digital diagnostics.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to as the "controller") controls the operation of the laser driver and post-amplifier.

The operation of an optical transceiver is susceptible to its operating environment and degradation effects caused by aging. For example, laser driver current for a transmitter may be varied with operating temperature in order to maintain a particular optical transmit power at the beginning of life of the transmitter. As the transmitter ages, the laser driver current can be increased relative to the beginning of life to compensate for degraded performance. Eventually, however, the increased laser driver current reaches and/or exceeds an indicator value that is indicative of potentially imminent transmitter failure. Because the laser driver current varies with temperature, the indicator value for laser driver current also varies with temperature and is not a constant.

It is often desirable for users of optical transceivers to receive alerts when laser driver current reaches and/or exceeds the indicator value. This enables optical transceivers within a system to be replaced before the transceivers actually fail and at a convenient time for the users, such as at night when disruptions to the system's operations may have the least impact. Conventionally, a static value corresponding to a worst case scenario is chosen as the indicator value. It is only after the laser driver current reaches and/or exceeds the static indicator value that an alert is triggered, regardless of the operating temperature. The result is that many times an alert is not triggered even though the laser driver current exceeds the indicator value corresponding to the operating temperature due to the fact that the laser driver current has not exceeded the static indicator value. Clearly, the conventional solution for triggering alerts using a static value fails to account for dynamic operating and/or environmental parameters, such as dynamic operating temperatures.

What is needed, therefore, are improved methods and systems for triggering alerts in optical transceivers based on dynamic conditions.

BRIEF SUMMARY OF THE INVENTION

The foregoing problems with the prior state of the art are overcome by the principles of the present invention, which relate to an optical transceiver that has at least one processor, a system memory, and persistent memory. The persistent memory includes microcode that represents a formulaic relation between a first independent parameter and an indicator value for a second dependent parameter. The first parameter may be, for instance, temperature. The second parameter may be, for example, laser driver current, or any other second parameter dependent on the first parameter. The microcode is further structured such that when loaded into system memory and executed by the processor(s), the optical transceiver accesses the first parameter as measured by a first parameter sensor, calculates an indicator value for the second parameter given the accessed first parameter using the formulaic relation, accesses the second parameter as measured by a second parameter sensor, and compares the indicator value with the second parameter to determine whether to trigger an alert.

Accordingly, alerts including laser driver current alarms can be triggered based on changing digital diagnostics such as temperature. This enables more accurate alerts that reflect actual operating and environmental conditions. Accordingly, early warnings for optical transceivers can be accurately provided under many different circumstances.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

The principles of the present invention relate to methods and systems for triggering alerts based on dynamic digital diagnostic information in optoelectronic devices. As digital diagnostic information is updated in response to changed conditions within the optoelectronic device, the threshold at which an alert is triggered is modified to reflect the changed conditions. The alert can be provided to a host and/or presented at the optoelectronic device to a user to indicate potentially imminent failure of the optoelectronic device.

The present invention can be implemented in various optoelectronic devices. As used herein, the term "optoelectronic device" includes devices having both optical and electrical components. Examples of optoelectronic devices include, but are not limited to optical transceiver modules ("optical transceivers"), transmitters, and/or receivers.

Figure 1:
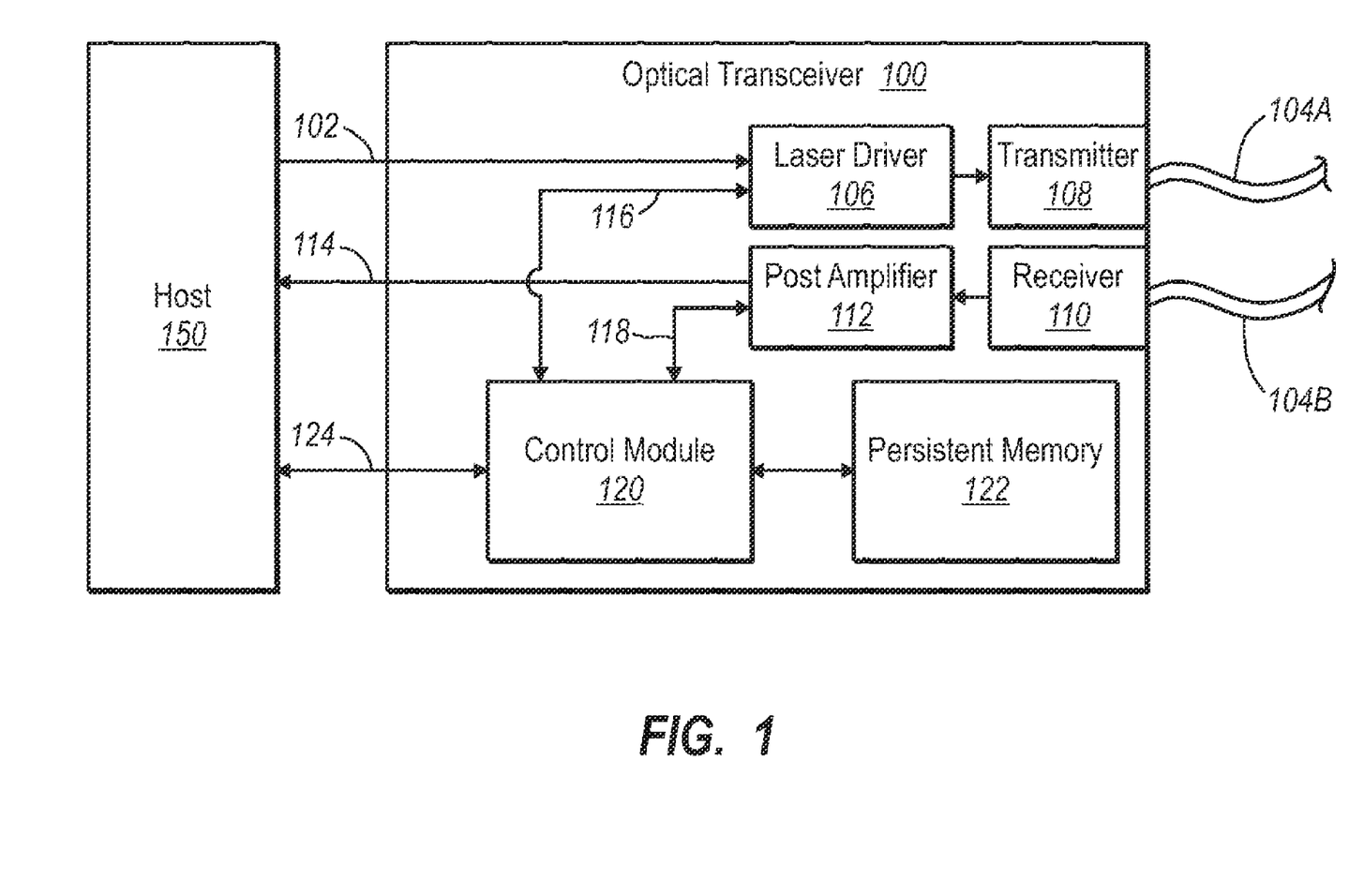
FIG. 1 schematically illustrates an example of an optical transceiver that may implement features of the present invention.

FIG. 1 illustrates a simplified block diagram of an example optical transceiver 100 in which the principles of the present invention may be employed. While the optical transceiver 100 will be described in some detail, the optical transceiver 100 is described by way of illustration only, and not by way of restricting the scope of the invention. The principles of the present invention allow for the optical transceiver 100 to provide dynamic alerts that may depend on various environmental and or operating parameters within the optical transceiver. The principles of the present invention are suitable for 1 G, 2 G, 4 G, 10 G and higher bandwidth fiber optic links. Furthermore, the principles of the present invention may be implemented in laser transmitter/receivers of any form factor such as XFP, SFP and SFF, without restriction.

During operation, the transceiver 100 can receive a data-carrying electrical signal 102 from the host 150, which can be any computing system capable of communication with the optical transceiver 100, for transmission as a data-carrying optical signal on to an optical fiber 104A using a laser driver 106 and a transmitter 108. In addition, the transceiver 100 is configured to receive a data-carrying optical signal from an optical fiber 104B for transmission as a data-carrying electrical signal to the host 150 using an optical receiver 110 and post-amplifier 112. Whereas the use of transceivers to transmit and receive data-carrying electrical and/or optical signals is well-known in the art, it will not be described in greater detail to avoid unnecessarily obscuring the invention.

The behavior of the receiver 110, the post-amplifier 112, the laser driver 106, and the transmitter 108 may vary dynamically due to a number of factors. For example, temperature changes, power fluctuations, feedback conditions, and aging effects may each affect the performance of these components. Accordingly, the optoelectronic device 100 further includes a control module 120, which can evaluate conditions pertinent to device operation, such as temperature, voltage or bias current, and other operational circumstances, and receive information from the post-amplifier 112 and the laser driver 106, as represented by arrows 118 and 116, respectively. This allows the control module 120 to optimize the dynamically varying performance, and additionally detect when there is a loss of signal. Specifically, the control module 120 may optimize the operation of the device 100 by adjusting settings on each of the driver 106 and/or post-amplifier 112 individually. These settings adjustments can be intermittent and are generally only made when temperature or voltage or other low frequency changes so warrant. The control module 120, the post-amplifier 112, and the laser driver 106 may be on the same chip. Alternatively, they may be distributed across two or more chips.

The control module 120 may have access to a persistent memory 122, which in one embodiment is an electrically erasable and programmable read-only memory ("EEPROM"). The persistent memory may also be any other non-volatile source. The persistent memory 122 and the control module 120 may be packaged together in the same package or in different packages without restriction.

Data may be exchanged between the control module 120 and the host 150 using an appropriate interface 124. In one embodiment, I$^2$C is implemented as the interface 124 between the host 150 and the control module 120 and clock and data signals may be provided from the host 150 using a serial clock line SCL and a serial data line SDA, both of which are represented in FIG. 1 by the interface 124. Also data may be provided from the control module 120 to the host 150 using serial data signal SDA to allow for digital diagnostics and readings of temperature levels, transmit/receiver power levels, and the like. Interfaces other than I$^2$C, such as MDIO or 1-wire, may also be implemented as the interface 124 between the host 150 and the control module 120.

Although not illustrated, in one embodiment the control module 120 includes both an analog portion and a digital portion. Such a configuration enables the control module to implement logic digitally, while still largely interfacing with the rest of the optical transceiver 100 using analog signals.

Figure 2:
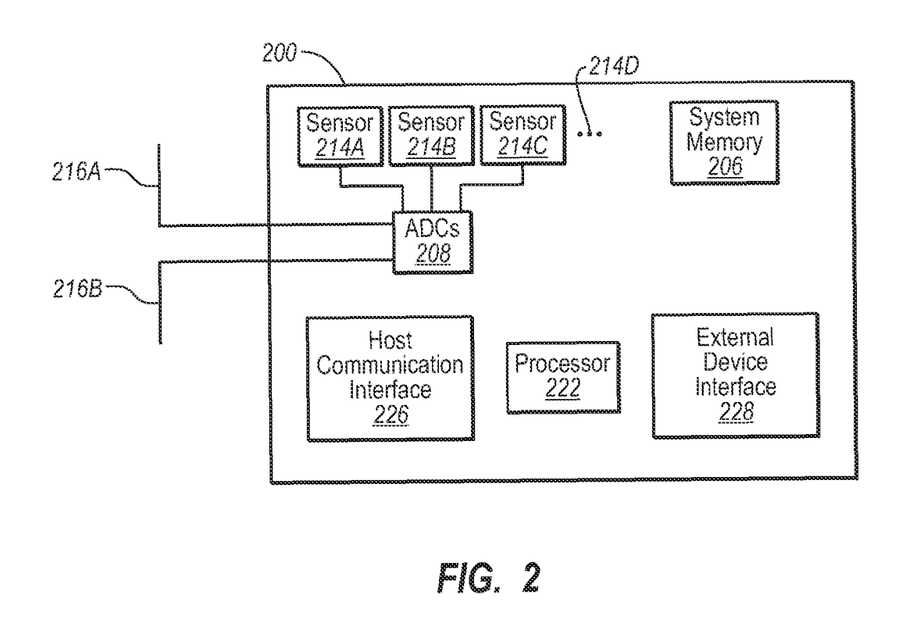
FIG. 2 schematically illustrates an example of a control module of FIG. 1.

FIG. 2 schematically illustrates an example configuration 200 of the control module 120 in further detail. The control module 200 includes one or more analog to digital converters ("ADCs") 208, at least one processor 222 and system memory 206. The control module 200 may also include sensors 214A, 214B and 214C amongst potentially others as represented by the horizontal ellipses 214D. Each of these sensors may be responsible for measuring environmental and/or operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 216A and 216B are illustrated for receiving such external analog signals although there may be many of such lines.

The internal sensors 214A through 214D may generate analog signals that represent the measured values. In addition, the externally provided signals 216A, 216B may also be analog signals. In this case, the analog signals are converted by the ADCs 208 to digital signals so as to be available to the processor 222 for further processing. Each analog parameter value may have its own ADC, or a single ADC can be used in conjunction with a multiplexer that periodically samples each of the analog signals.

In addition to or in lieu of one or more of those components already mentioned, the control module 200 may contain digital to analog converters, high-speed comparators (e.g., for event detection), voltage-based reset generators, voltage regulators, voltage references, clock generators, multiplexers, timers, and other components. High-speed comparators may be supplied with one input being from an internal sensor or from an external line to receive a measured parameter value. The other input to the comparator may be a comparison value. Should the measured parameter value exceed the comparison value, the comparator may generate a logical high (or low) which indicates that the event has occurred. For example, suppose that the standard maximum transceiver temperature is 85 degrees Celsius. The actual measured transceiver temperature may be provided as one input to a comparator, while a value representing 85 degrees Celsius is provided to the other input of the comparator. A timer may provide various timing signals, such as programmable processor times. The timer may also act as a watchdog timer.

The processor 222 may recognize instructions that follow a particular instruction set, and may perform normal general-purpose operations such as shifting, branching, adding, subtracting, multiplying, dividing, Boolean operations, comparison operations, and the like. In one embodiment, the processor 222 is a 16-bit general-purpose processor. The precise structure of the instruction set is not important to the principles of the present invention as the instruction set may be optimized around a particular hardware environment, and as the precise hardware environment is not important to the principles of the present invention.

A host communications interface 226 may be provided to communicate with the host using, for example, serial data and serial clock lines of an I$^2$C interface, as previously mentioned, although other interfaces may also be used. An external device interface 228 may be provided for communicating with, for example, other modules within the optical transceiver 100 such as, for example, the post-amplifier 112, the laser driver 106, or the persistent memory 122.

The internal system memory 206 (not to be confused with the external persistent memory 106) may be Random Access Memory (RAM). Although not illustrated, a memory controller may be provided for sharing access to the system memory 206 amongst the processor 222, the host communication interface 226 and the external device interface 228.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

As previously mentioned, the present invention is directed to systems and methods for triggering alerts, such as laser driver current ("LDI") alarms, based on dynamic digital diagnostics, such as operating temperature values, which can be generated in the environments of FIGS. 1 and 2, as well as in other architectures. This enables an optoelectronic device user to receive, for instance, an early warning of potentially imminent device failure, and to take corrective action, such as replacing the optoelectronic device before the device actually fails.

Figure 3:
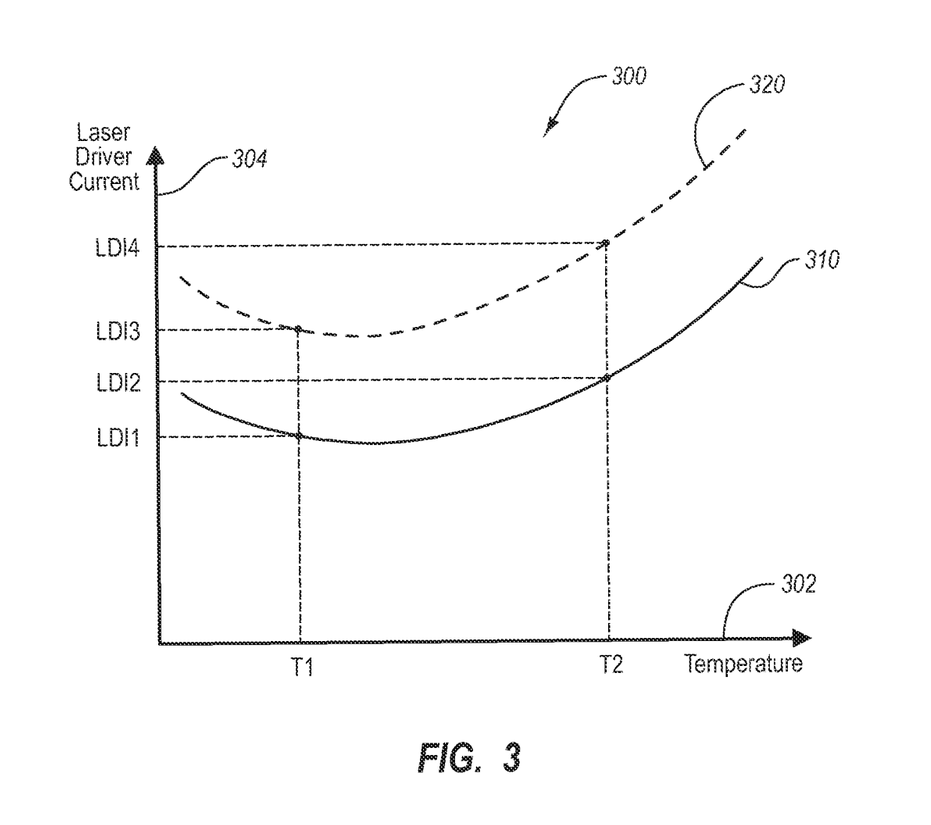
FIG. 3 depicts one embodiment of a relation between operating temperature, laser driver current, and laser driver current indicator values.

FIG. 3 graphically illustrates an example relation between temperature 302 and laser driver current 304 that may be useful in understanding at least some of the advantages of triggering alerts based on dynamic digital diagnostics as opposed to triggering alerts based on a static value. It is understood that FIG. 3 is illustrative only and should not be construed to limit the invention.

Figure 5:
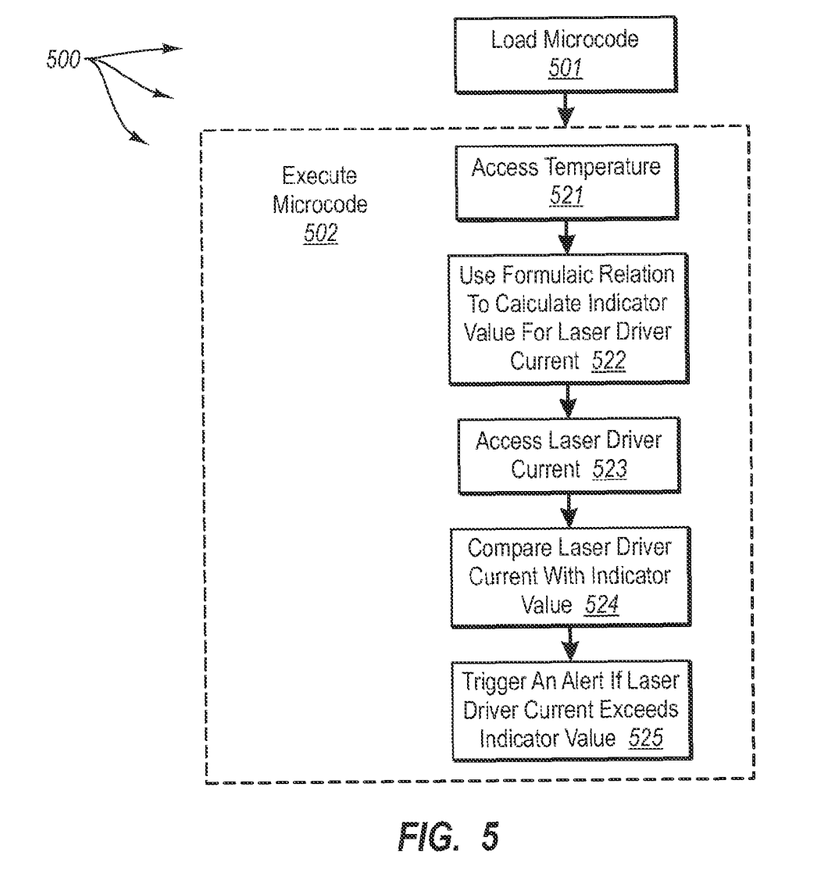
FIG. 5 illustrates one embodiment of a method for an optical transceiver to trigger an alert based on dynamic information in accordance with the principles of the present invention.

FIG. 3 includes two curves 310 and 320. In the present embodiment, the lower curve 310 represents optimized laser driver current and temperature pairs at the beginning of life of a transmitter, such as the transmitter 108 of FIG. 1. The laser driver current and temperature pairs may be optimized to sustain a particular optical transmit power at the transmitter. In the present example, a laser driver current LDI1 corresponds to an operating temperature T1 and a laser driver current LDI2 corresponds to an operating temperature T2. FIG. 5 illustrates that the laser driver current may vary with temperature.

As the transmitter 108 ages, its performance degrades, which can result in decreased optical transmit power. One way to compensate for the degradation and maintain the optical transmit power is to increase the laser driver current relative to the beginning of life curve 310. Eventually, however, the increased laser driver current reaches and/or exceeds a value that is indicative of potentially imminent transmitter failure. This value may be referred to as the indicator or threshold value and may be different depending on the temperature 302. For example, in the present embodiment the upper curve 320 represents indicator value and temperature pairs. In this embodiment, an indicator value LDI3 corresponds to operating temperature T1 and an indicator value LDI4 corresponds to operating temperature T2. It should be apparent to one skilled in the art that, as illustrated in FIG. 3, the indicator value at a first temperature may be different than the indicator value at a second temperature. In other words, the indicator value is not constant across all operating temperatures.

As previously described in the background section, it is often desirable for users of optoelectronics devices to receive alerts when laser driver current reaches and/or exceeds the indicator value. Conventionally, a static value is chosen as the indicator value. For instance, if operating temperature T2 corresponds to the worst case scenario, indicator value LDI4 might be chosen as the static indicator value. In this case, while operating at temperature T1, an alert might not be triggered in the optoelectronic device until the laser driver current reaches and/or exceeds LDI4, even though the indicator value at temperature T1 is LDI3. This can prevent the user from receiving sufficient warning to replace the optoelectronic device before the optoelectronic device fails.

Advantageously, however, the present invention enables alerts to be triggered based on dynamic parameters. Thus, an alert can be triggered when laser driver current reaches and/or exceeds indicator value LDI3 while operating at temperature T1 and when laser driver current reaches and/or exceeds indicator value LDI4 while operating at temperature T2.

Embodiments of a method and system for triggering alerts based on dynamic parameters will now be discussed with respect to FIGS. 4 and 5. While discussed in the context of temperature and laser driver current, it is understood that the principles of the invention can apply in many situations involving one or more first independent parameters and one or more second dependent parameters.

Figure 4:
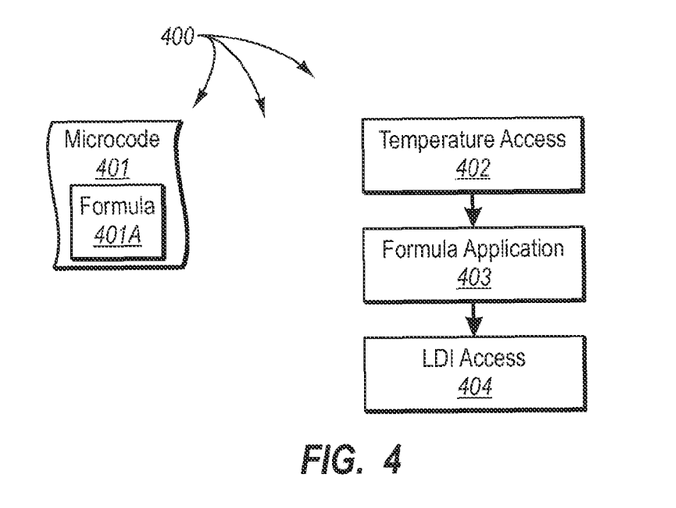
FIG. 4 illustrates one embodiment of a software architecture that may be maintained in system memory during runtime in accordance with the principles of the present invention.

FIG. 4 illustrates a software architecture 400 that may be instantiated in system memory 206. In particular, the processor 222 loads microcode 401 into the system memory 206 from the persistent memory 122. The remainder of the software architecture 400 is either instantiated in system memory 206 upon the execution of the microcode 401, or else abstractly represents functionality implemented by the optoelectronic device 100 upon the execution of the microcode 401. Alternatively, the microcode 401 may be directly executed from persistent memory. In that case, the microcode 401 is loaded into the system memory a fraction at a time (e.g., one instruction at a time) for execution by the processor. In this latter case, the system memory may be a register, flip-flops, or any other memory regardless of size or type.

The software architecture 400 includes a temperature access component 402, a formula application component 403, and a laser driver current access component 404. The software architecture 400 of FIG. 4 will be described with reference to FIG. 5, which illustrates a flowchart of a method 500 for the optical transceiver to trigger an alert based on dynamic digital diagnostics. In the present example, the alert in question is a laser driver current alarm, and the alert can be triggered at different indicator values depending on dynamic digital diagnostics such as temperature.

First, the optical transceiver 100 loads the microcode 401 from persistent memory 122 to system memory 206 (act 501). If the persistent memory 122 is an I$^2$C EEPROM, then this may be accomplished using the conventional I$^2$C two-wire interface. However, for other persistent memories, other communication protocols may be used. The microcode is structured to represent a formulaic relation 401A between temperature and the indicator value for laser driver current. For example, the formulaic relation may be a linear relation, or another higher-order polynomial relation. The formulaic relation may even be a non-polynomial expression.

The processor 222 then executes the microcode (act 502). The microcode 401 is structured such that the optical transceiver performs the acts illustrated within act 502 when executed. Specifically, the optical transceiver accesses the temperature as measured by a temperature sensor (act 521). This may be accomplished, for example, using the temperature access component 402. Any one of the sensors 214A-214D may be responsible for measuring temperature. The microcode may cause the processor to access the temperature from the temperature sensor directly, or may read the temperature from a register location that is periodically updated with values obtained from the temperature sensor. The measuring of the temperature may involve calculating the temperature based on an averaging of a current temperature with a previously sensed temperature.

The microcode 401 then causes the optical transceiver 100 to calculate an indicator value for the laser driver current given the accessed temperature using the formulaic relation (act 522). This may be accomplished, for example, by the formula application component 403 applying the formulaic relation 401A represented by the microcode 401.

In one embodiment, the formulaic relation is obtained by taking several sample points in a temperature versus laser driver current value curve and accounting for aging effects. Standard statistical curve fitting technology may then be used to fit a line or curve having particular characteristics (e.g., linear, polynomial, exponential, or the like) so as to reduce the sum of the squares of the error across all sample points. The curve-fitting techniques used to form the formulaic relation may be any known technique. Such curve-fitting techniques are known in the art and thus will not be described herein.

In one embodiment, the formulaic relation is obtained during calibration of the optical transceiver 100. The formulaic relation may even have been obtained during a self-calibration process, which is described in commonly-assigned, co-pending U.S. patent application Ser. No. 10/882,447, filed Jun. 30, 2004 and entitled "Microcode-Driven Self-Calibration of Optical Transceiver to Environmental Conditions", which patent application is incorporated herein by reference in its entirety. Briefly stated, the self-calibration process involves placing the optical transceiver 100 in an environment in which a first parameter (e.g., temperature) should change, measuring the first parameter under the range of expected conditions, determining what the indicator values for the associated second parameter should be given each of these first parameter values, and then recording the relation either in table form, or as a formulaic relation.

Returning to FIG. 5, after applying the formulaic relation (act 522), the microcode 401 causes the optical transceiver 100 to access the laser driver current as measured by a laser driver current sensor (act 523). This may be accomplished, for instance, using the laser driver current access component 404. In one embodiment, an external sensor at the laser driver measures the laser driver current and reports it to the control module 200 using one of the external lines 216A or 216B. Thus, the processor may access the laser driver current from a register location that is periodically updated with values obtained from the laser driver current sensor. Alternately, the processor may access the laser driver current from the laser driver current sensor directly.

The microcode 401 then causes the processor 222 to compare the measured laser driver current with the calculated indicator value (act 524). If the measured laser driver current is equal to and/or greater than the calculated indicator value, an alert is triggered (act 525). The alert may be a laser driver current alarm indicative of potentially imminent failure of the transmitter in the optical transceiver. The alert may be provided to the host and/or otherwise presented to a user. In effect, the alert is an early warning enabling the user to replace the optical transceiver at the user's convenience prior to actual failure of the transmitter.

A specific example in which a first independent parameter is temperature, and a second dependent parameter is laser driver current has been described. However, the principles of the present invention may apply to any measurable first and second parameters. For example, the first parameter may be supply voltage, humidity, acceleration, ambient light levels, ambient vibration, magnetic flux intensity, or any other parameter upon which a second parameter depends. Furthermore, although a specific example of a second dependent parameter has been mentioned in the form of laser driver current, indicator values for other dependent parameters may also be calculated and used to trigger alerts in the optical transceiver. Such dependent parameters may include, for example, a Thermo Electric Cooler (TEC) current.

An embodiment in which the microcode may be structured to apply a formulaic relation between a single independent parameter and indicator values for a single dependent parameter has been described. However, the principles of the present invention may be applied to microcode that applies formulaic relations between indicator values for multiple dependent parameters and a single independent parameter, or that applies formulaic relations between indicator values for a single dependent parameter and multiple independent parameters, or that applies a formulaic relation between indicator values for multiple dependent parameters and multiple independent parameters.

Accordingly, the principles of the present invention permit an optical transceiver to determine an indicator value for one or more dependent parameters without representing a table relation of the independent parameter to the indicator value of the dependent parameter. Instead, a formulaic relation representing the correlation is represented. This reduces the amount of memory needed to maintain the table. The microcode, system memory, or persistent memory need not have any table information describing the relationship at all. In another embodiment, a table may represent the relation for only a portion of the independent parameter range, while the formulaic relation is used for other independent parameter ranges. The formulaic relation might then be used only after the microcode forces a determination that the measured independent parameter falls outside of the independent parameter range for the table.

The principles of the present invention may also be applied to an optical receiver without an optical transmitter, or to an optical transmitter without an optical receiver. Accordingly, the principles of the present invention are not limited to the optical transceiver environment.

Embodiments within the scope of the present invention include computer-readable media for carrying or having computer-executable instructions or electronic content structures stored thereon, and these terms are defined to extend to any such media or instructions that are used with transceiver and other device modules. By way of example, and not limitation, such computer-readable media can comprise RAM, ROM, EEPROM, CD-ROM or other optical disk storage, magnetic disk storage or other magnetic storage devices, or any other medium which can be used to carry or stored desired program code in the form of computer-executable instructions or electronic content structures and which can be accessed by a general purpose or special purpose computer, or other computing device.

When information is transferred or provided over a network or another communications connection (such as an $I^2C$ interface between a host and a transceiver) to a computer or computing device, the computer or computing device properly views the connection as a computer-readable medium. Thus any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Compute-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver, a method for the optical transceiver to trigger an alert based on dynamic digital diagnostic information, the method comprising:

executing microcode using at least one processor in an optical transceiver, wherein the microcode is structured to represent a formulaic relation between a first parameter and an indicator value for a second parameter, wherein the microcode is further structured such that the optical transceiver performs the following when the microcode is executed by the at least one processor:

accessing the first parameter as measured by a first parameter sensor;

calculating an indicator value for the second parameter given the accessed first parameter using the formulaic relation;

accessing the second parameter as measured by a second parameter sensor; and comparing the indicator value with the second parameter to determine whether to trigger an alert;

when the alert is triggered, providing the alert to a host or presenting the alert to a user.

2. The method of claim 1, further comprising, prior to executing the microcode, loading the microcode from a persistent memory of the optical transceiver to a system memory of the optical transceiver.

3. The method of claim 1, wherein when the microcode is executed by the at least one processor, the optical transceiver further performs the following: in response to determining that the second parameter exceeds the indicator value, triggering an alert indicative of the second parameter exceeding the indicator value.

4. The method of claim 3, wherein the second parameter exceeding the indicator value indicates potentially imminent failure of the optical transceiver and the alert comprises an early warning of potentially imminent failure of the optical transceiver.

5. The method of claim 1, wherein the first parameter comprises temperature and the first parameter sensor comprises a temperature sensor.

6. The method of claim 1, wherein the second parameter comprises laser driver current and the second parameter sensor comprises a laser driver current sensor.

7. The method of claim 1, wherein the formulaic relation is one or more of: a linear approximation, a polynomial approximation, and a non-polynomial approximation.

8. A method of triggering a laser driver current alarm in an optoelectronic device based on dynamic operating temperatures, the method comprising:

retrieving a temperature as measured by a temperature sensor of an optoelectronic device;

determining a laser driver current indicator value based on the retrieved temperature, wherein the indicator value is dependent on the retrieved temperature;

retrieving a laser driver current as measured by a laser driver current sensor of the optoelectronic device; and comparing the indicator value with the laser driver current to determine whether to trigger a laser driver current alarm;

in response to determining that the laser driver current exceeds the indicator value, triggering the laser driver current alarm, wherein triggering the laser driver current alarm comprises providing an alert indicative of potentially imminent optoelectronic device failure to a host communicably connected to the optoelectronic device or to a user.

9. The method of claim 8, wherein the method is performed by the optoelectronic device when microcode structured to cause the optoelectronic device to perform the method is executed using at least one processor in the optoelectronic device, wherein the microcode is further structured to represent a formulaic relation between the temperature and the indicator value.

10. The method of claim 9, further comprising, prior to executing the microcode using the at least one processor, loading the microcode from a persistent memory of the optoelectronic device to a system memory of the optoelectronic device accessible by the at least one processor.

11. The method of claim 9, wherein determining the indicator value for the laser driver current based on the retrieved temperature comprises calculating the indicator value given the retrieved temperature using the formulaic relation.

12. The method of claim 9, wherein the formulaic relation is one or more of: a linear approximation, a polynomial approximation, and a non-polynomial approximation.

13. The method of claim 8, wherein a first indicator value at a first temperature is different than a second indicator value at a second temperature.

14. An optoelectronic device comprising:
   at least one processor;
   a system memory; and
   a persistent memory, wherein the persistent memory contains microcode that is structured to represent a formulaic relation between an independent parameter and indicator values for a dependent parameter, wherein the microcode is further structured such that the optoelectronic device performs the following when executed by the at least one processor:
   accessing the independent parameter as measured by an independent parameter sensor;
   calculating an indicator value for the dependent parameter using the formulaic relation given the accessed independent parameter;
   accessing the dependent parameter as measured by a dependent parameter sensor; and
   triggering an alert in response to determining that the dependent parameter exceeds the indicator value, wherein the alert is indicative of a potentially imminent optoelectronic device failure.

15. The optoelectronic device of claim 14, wherein the persistent memory comprises electrically erasable and programmable read-only memory.

16. The optoelectronic device of claim 14, wherein the system memory comprises random access memory.

17. The optoelectronic device of claim 14, wherein the independent parameter comprises optoelectronic device operating temperature and the dependent parameter comprises laser driver current.

* * * * *